United States Patent Office 2,916,521
Patented Dec. 8, 1959

2,916,521

SUBSTITUTED STYRENES

Raymond I. Longley, Jr., Springfield, Mass., assignor to Monsanto Chemical Company, St. Louis, Mo., a corporation of Delaware No Drawing. Application January 2, 1958
Serial No. 706,590

2 Claims. (Cl. 260—613)

This invention relates to novel ring substituted styrene monomers containing reactive hydroxyl groups. More particularly, it relates to hydroxyalkyl vinylphenyl ethers.

Since the advent of polystyrene with its tremendous impact upon the plastics industry, considerable research effort has been expended in the discovery and development of new and useful derivatives of this resin. A great number of substituted styrene monomers and polymers thereof have been reported, many of which have excellent commercial potential.

Now, it is an object of this invention to provide novel ring substituted styrene monomers.

Another object is to provide novel styrene monomers containing stable ring substituted hydroxyalkyl ether groups.

A further object is to provide a method by which such monomers may be produced.

These and other objects are attained by the provision of novel styrene monomers corresponding to the general formula:

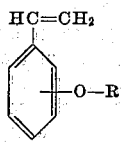

wherein R is a primary or secondary monohydric alkanol containing from 2 to 4 carbon atoms. The preferred process for producing these monomers, described succinctly, consists of haloethylating a hydroxyalkyl phenyl ether with acetaldehyde and a hydrohalogen at a temperature of from −20 to 50° C. and subsequently dehydrohalogenating the reaction product thereof at a temperature of from 50 to 250° C.

The following examples are given in illustration of the invention and are not intended as limitations thereof.

Example I

One gram mol of 2-phenoxyethanol and at least 1 gram mol of acetaldehyde are charged to a reaction vessel equipped with a stirrer and mounted in an ice bath. Hydrogen chloride gas is passed into the reaction mixture while stirring; the temperature being initially about 20° C. and then being reduced gradually to about 5° C. Gas addition is continued until the reaction is substantially complete, circa 1 hour. The reaction mixture is then dissolved in about 200 ml. of toluene and any excess hydrogen chloride is neutralized by adding dilute aqueous potassium carbonate solution and vigorously agitating the resultant two-phase solution to maximize contact between the aqueous phase and the toluene phase. The toluene phase is separated, e.g., by decantation, and about 100 ml. of pyridine is added thereto. The solution is heated and substantially all of the toluene, pyridine and remaining acetaldehyde are removed by distillation. The residue is treated with dilute aqueous hydrochloric acid solution to neutralize any remaining pyridine; the aqueous phase being decanted. The residue is then dissolved in about 200 ml. of ether. Fractional distillation first separates the solvent, then any unreacted 2-phenoxyethanol, and finally 0.03 mol of product, i.e., 2-hydroxyethyl p-vinylphenyl ether, is recovered at a temperature of 92–96° C. when the pressure is reduced to about 1 mm. of mercury. A viscous residue of ethylidine bis(p-phenyl 2-hydroxyethyl ether) remains; pyrolysis of this at a temperature of 450° C. in the presence of nitrogen as a carrier gas produces an additional 0.12 mol of product which is recovered as the first condensation product upon gradual cooling of the effluent gas stream.

The hydroxyalkyl phenyl ethers from which the monomers of this invention are prepared correspond to the general formula:

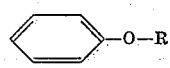

wherein R is a primary or secondary monohydric alkanol radical containing from 2 to 4 carbon atoms. Examples include 2-phenoxyethanol (2-hydroxyethyl phenyl ether), 3-hydroxypropyl phenyl ether, 2-hydroxypropyl phenyl ether, 4-hydroxybutyl phenyl ether, 3-hydroxybutyl phenyl ether, 3-hydroxyisobutyl phenyl ether, etc. These hydroxyalkyl phenyl ethers are well-known and are conventionally prepared either by reacting sodium phenoxide with the corresponding chlorohydrin or by reacting phenol with the corresponding alkylene oxide.

Acetaldehyde and hydrogen chloride are preferably employed as the haloethylating reactants. If desired, the acetaldehyde may be replaced by the polymers thereof, e.g., paraldehyde, etc. However, 1–2 carbon alkyl alpha-chloroethyl ethers or alkyl vinyl ethers may also be substituted for the acetaldehyde, e.g., alpha-chloroethyl methyl ether, alpha-chloroethyl ethyl ether, methyl vinyl ether, etc. Also, hydrogen bromide may be substituted for the hydrogen chloride if desired.

For purposes of discussion, the process for producing the monomers of this invention is best divided into three parts. These are: (1) the haloalkylation of the hydroxyalkyl phenyl ether, (2) the dehydrohalogenation of the reaction product thereof, and (3) recovery of the product.

In the first part of the process, the hydroxyalkyl phenyl ether is reacted with the acetaldehyde and hydrogen chloride at a temperature of from −20 to 50° C., temperatures of from 0° to 25° C. being especially preferred. Theoretically, equimolar proportions of the reactants are required. However, in practice it is advantageous to employ excess acetaldehyde and hydrogen chloride.

Upon completion of the first part of the process, any remaining hydrogen chloride should be neutralized and the resulting salt removed from the reaction mixture. This may be accomplished according to conventional techniques. For example, the reaction mixture is dissolved in a minimum quantity of a substantially water immiscible organic solvent therefor, e.g., toluene, benzene, etc. This organic solution is washed with an aqueous solution of an alkaline compound, e.g., potassium carbonate, etc., and the organic phase is separated by decantation or other conventional means.

If the above neutralization and washing step is omitted, one of the water immiscible organic solvents described therein must be used to dissolve the reaction mixture prior to commencing part (2) of the process.

In the second part of the process, the organic solvent solution of the reaction mixture is treated with a dehydrohalogenating agent at a temperature of from 50 to 250° C. The conventional dehydrohalogenating agents are well-known and may be used in this process. For example, pyridine, dibenzylamine, diethylamine, aniline, piperidine, quinoline alkaloids, etc., including the salts thereof derived from hydrochloric, sulfuric, phosphoric or acetic acids. Inorganic dehydrohalogenating agents include potassium hydroxide, sodium hydroxide, calcium hydroxide, etc. Generally, the use of excess dehydrohalogenating agent is preferred. However, the salts of the organic amines described are catalytic in action and concentrations thereof of at least 0.2 mol per mol of initial hydroxyalkyl vinylphenyl ether are satisfactory. These catalytic dehydrohalogenating agents, however, must be employed at temperatures above 150° C.

Finally, in the third part of the process, the reaction product must be recovered. The reaction mixture is distilled to remove substantially all of the solvent and, depending upon its boiling point, possibly all or part of the dehydrohalogenating agent. If desired, the residue may be neutralized by washing with a small quantity of a dilute aqueous solution of an inorganic acid, e.g., hydrochloric acid. Whether neutralized or not, the residue is then redissolved in an organic solvent, e.g., toluene, benzene, ether, etc. Fractional distillation is then employed to separate the solvent, unreacted hydroxyalkyl phenyl ether, any remaining dehydrohalogenating agent and the desired hydroxyalkyl vinylphenyl ether monomers, leaving a viscous residue.

The viscous residue consists in great part of ethylidine bis (phenyl hydroxyalkyl ethers) corresponding to the general formula:

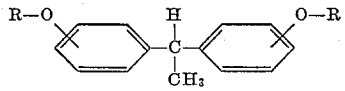

wherein R is a radical as previously disclosed. Substantially increased yields of the monomers of this invention are recovered by pyrolysis of these residues. Generally, this is accomplished by vaporizing these residues in a suitable vessel at temperatures of from 400 to 600° C. in the optional presence of an inert carrier gas, e.g., nitrogen, etc. If desired, the vaporized residue may be passed over a clay bed at such elevated temperatures to catalyze the decomposition. On subsequent cooling of the effluent stream, the hydroxyalkyl vinylphenyl ether product will be the first fraction to condense.

The monomers of this invention contain reactive hydroxyl groups. They may be homopolymerized but are particularly useful when polymerized in combination with other monomers copolymerizable therewith to form copolymers and terpolymers. Examples of such copolymerizable monomers include styrene, divinyl benzene and the alkyl and halo ring substituted derivatives thereof; e.g., o-, m- and p-methyl or ethyl styrenes, mono-, di-, or tri-chloro or fluoro styrenes, etc.; the alkyl acrylates and methacrylates such as methyl acrylate, butyl acrylate, methyl methacrylate, etc; the conjugated dienes such as butadiene, etc.; acrylonitrile, etc.

Copolymers and terpolymers prepared using the compounds of this invention are particularly suitable for use as surface coatings, e.g., on glass, metals, wood, rubber, synthetic rubber, vinyl, linoleum, etc. An example of a terpolymer suitable for such use is as follows.

*Example II*

A mixture consisting of 10 parts of 2-hydroxyethyl-p-vinylphenyl ether, 30 parts of styrene, 60 parts of butyl acrylate and 0.2 part of benzoyl peroxide is added gradually over a 3-hour period to about 200 parts of toluene heated to reflux temperature; all parts being parts by weight. The batch is maintained at reflux temperature for an additional 2 hours to complete the terpolymerization. The terpolymer solution obtained is concentrated by evaporating a portion of the toluene solvent and the resulting syrupy solution is spread onto a glass plate in a uniform 0.003 inch film. The plate is air dried 20 minutes then baked in an over at 180° C. for about 20 minutes and then cooled. The resulting transparent film is tough, resilient and resistant to solvents.

In other important applications polymers as described above containing at least 5% by weight of the monomers of this invention are cross-linked with minor proportions of polyreactive compounds such as melamine-aldehyde resins, diisocyanates or polyreactive acids, esters, anhydrides, epoxides, etc. These second-stage cross-linked polymers are particularly useful as laminating resins but may also be used in chemical resistive coatings, molding compounds, etc. as thermosetting resins.

Polymers derived from the monomers of this invention are further useful as non-volatile adhesives for polar surfaces, e.g., polyester laminates, etc.

The monomers of this invention are also important as chemical intermediates in the preparation of other new and useful materials. For example, these monomers may be reacted with reactive acids, esters, anhydrides, epoxides, isocyanates, etc. The monomers are further useful as combined solvent and cross-linking agents for polyesters.

It is obvious that many variations may be made in the products and processes of this invention without departing from the spirit and scope thereof.

What is claimed is:

1. A process for preparing hydroxyalkyl vinylphenyl ethers corresponding to the general formula:

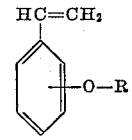

which comprises reacting one molar proportion of a hydroxyalkyl phenyl ether with at least one molar proportion of an ethylating agent and at least one molar proportion of a hydrohalogen selected from the group consisting of hydrogen chloride and hydrogen bromide at a temperature of from −20 to 50° C. and subsequently dehydrohalogenating the reaction product thereof at a temperature of from 50 to 250° C.; said hydroxyalkyl phenyl ether corresponding to the general formula:

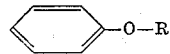

wherein, in each of the above formulae, R is a radical selected from the group consisting of primary and secondary monohydric alkanol radicals containing from 2 to 4 carbon atoms; said ethylating agent being a compound selected from the group consisting of acetaldehyde and polymers thereof and alkyl alpha-chloroethyl ethers and alkyl vinyl ethers wherein the alkyl group contains from 1 to 2 carbon atoms.

2. A process as in claim 1 wherein the hydroxyalkyl phenyl ether is 2-hydroxyethyl phenyl ether and the ethylating agent is acetaldehyde.

References Cited in the file of this patent

UNITED STATES PATENTS 2,850,480  D'Alelio _____ Sept. 2, 1958